3,288,732
PREPARATION OF OPEN-CELL RIGID
POLYURETHANES
John Frederick Chapman and Ian David Rosbotham, Manchester, England, assignors to Imperial Chemical Industries Limited, London, England, a corporation of Great Britain
No Drawing. Filed Dec. 16, 1963, Ser. No. 330,561
Claims priority, application Great Britain, Dec. 21, 1962, 48,474/62
7 Claims. (Cl. 260—2.5)

This invention relates to improvements in or relating to the manufacture of polymeric materials and more particularly to the manufacture of polyurethane foams.

It has already been proposed to manufacture polyurethane foams by the interaction of an organic polyisocyanate with a hydroxyl group-containing resin in the presence of gas-generating agents, for example water and inert liquids of low boiling-point. Hydroxyl group-containing resins which have been proposed include linear and branched polyesters, polyethers and polyesteramides. The selection of a particular resin depends upon the nature of the foam it is desired to produce. Thus in the manufacture of rigid polyurethane foams the resins used are normally those having a highly branched structure. The use of mixtures of hydroxyl group-containing resins is known in polyurethane manufacture but the use of mixtures of dissimilar resins, for example mixtures of polyesters and polyethers or mixtures of linear and highly branched resins has been limited by the fact that dissimilar resins are, in general, mutually incompatible and this has been regarded as somewhat disadvantageous.

The highly branched resins which are used in the manufacture of rigid foams afford products which have excellent mechanical properties at certain densities but the production of very low density foams from these resins has been less successful. In particular, the combination of low density with high rigidity makes such foams extremely friable and hence causes handling difficulties. Furthermore, rigid polyurethane foams normally contain a high proportion of closed cells and whilst this is desirable for many purposes, it is found that at very low densities, for example densities of less than 1.5 lb. per cubic foot, closed cell foams usually shrink.

It has now been found that the difficulties associated with the production of very low density, rigid polyurethane foams may be obviated or minimised by using as the hydroxyl group-containing resin component, a mixture of such resins which contains from 30% to 70% by weight of a highly branched resin as herein defined, the remainder being a linear or lightly branched resin as herein defined which is incompatible with the highly branched resin, and carrying out the reaction with the polyisocyanate in the presence of an inert volatile liquid and at least 6% by weight of water based on the highly branched resin.

Thus whilst the foams produced by this process may be properly considered as rigid foams they are sufficiently yielding to permit recovery from small deformations. They may, therefore, in spite of their low densities, be handled without difficulty and can be used under conditions where vibration may be expected to occur. Moreover as a result of having a substantially open cell structure the foams have complete dimensional stability at all densities and at all temperatures up to the softening point of the polymer of which they are composed. By a substantially open cell structure is meant a structure in which at least 90% of the cells of the foam are intercommunicating one with another throughout the foam and with the surrounding atmosphere.

The foamed products obtained by the process described herein have many possible uses amongst which are the filling of all manner of cavities and sandwich panels, for strengthening, thermal and acoustic insulation and structural purposes. The open-celled nature of the foams makes them suitable for use as filtration media.

Thus according to the present invention there is provided a process for the manufacture of substantially open-celled rigid polyurethane foams which comprises interacting (a) an organic polyisocyanate, (b) a mixture of hydroxyl group-containing resins which contains from 30% to 70% by weight of a highly branched resin as herein defined, the remainder being a linear or lightly branched resin as herein defined which is incompatible with the highly branched resin and (c) at least 6% by weight of water based on the highly branched resin, in the presence of a low boiling-point liquid which is inert towards the polyurethane foam-forming ingredients.

For the purpose of the present invention a highly branched resin may be defined as a resin which has at least 3 hydroxyl groups per 1000 units of molecular weight and a lightly branched resin as one which has not more than 3 hydroxyl groups per 1500 units of molecular weight. Linear resins contain 2 hydroxyl groups per molecule.

The term incompatible is to be regarded as covering resins which are incapable of being blended into a stable homogeneous mixture in the absence of other materials and also resins which are incapable of being blended into a stable homogeneous mixture in the presence of the other foam-forming ingredients except the polyisocyanate.

The advantages of the process of the present invention are more fully realised when the resin mixture contains from 45% to 60% by weight of the highly branched resin.

The highly branched resins to be used in the process of the present invention include hydroxyl group-containing polyesters, polyesteramides and oxyalkylation products of active hydrogen-containing compounds.

The polyesters or polyesteramides may be made, for example, from polycarboxylic acids and polyhydric alcohols and, as necessary, minor proportions of polyamines or aminoalcohols. Suitable polycarboxylic acids include dicarboxylic acids, for example succinic, glutaric, adipic, sebacic, phthalic, isophthalic and terephthalic acids and acids of higher functionality, for example, trimesic and trimellitic acids. Examples of polyhydric alcohols include glycols, for example ethylene glycol, 1:2-propylene glycol, 1:3-butylene glycol, 2:3-butylene glycol and diethylene glycol and polyhydric alcohols of higher functionality, for example, glycerol, trimethylolpropane, triethanolamine, pentaerythritol and sorbitol. Examples of polyamines and amino-alcohols that may be used to make polyesteramides include ethylene diamine, hexamethylene diamine, tolylene diamine, ethanolamine and diethanolamine. In making the polyesters and polyesteramides the proportions of reactants are selected in known manner so as to yield materials having at least 3 hydroxyl groups per 1000 units of molecular weight.

Suitable highly branched oxyalkylation products of active hydrogen-containing compounds include polyethers prepared, for example, by the polymerisation of an alkylene oxide in the presence of a basic catalyst and a substance having more than two active hydrogen atoms per molecule, for example, ammonia, hydrozine and polyhydroxy compounds such as glycerol, trimethylol-ethane, trimethylolpropane, triethanolamine, pentaerythritol, sorbitol, sucrose, phloroglucinol and phenolformaldehyde reaction products, amino alcohols such as ethanolamine and diethanolamine and polyamines such as ethylene diamine, tolylene diamine and diaminodiphenylmethane. Suitable alkylene oxides for the polymerisation include ethylene oxide, 1:2-propylene oxide, 1:2-butylene oxide, 2:3-butylene oxide and epichlorohydrin. Branched polyethers may also be produced by copolymerising alkylene oxides with cyclic oxides having a functionality greater than two, for example di-epoxides, glycidol and 3-hydroxymethyl oxacyclobutane. Other oxylalkylation products of active hydrogen-containing compounds which may be used include products obtained by reacting polyamines, for example tolylene diamine with up to about one molecular proportion of alkylene oxide per active hydrogen atom. Such products do not contain ether groups.

Mixtures of highly branched resins may be used if desired.

Suitable linear or lightly branched resins for use in the process of the present invention include hydroxyl group-containing polyesters, polyesteramides and polyethers.

The linear polyesters or polyesteramides may be made, for example from dicarboxylic acids and glycols and, as necessary, minor proportions of diamines or aminoalcohols. Where it is desired to introduce a slight degree of branching, minor amounts of compounds having more than two ester- or amide-forming groups per molecule may be incorporated in the reaction mixture. Suitable examples of starting materials for use in the manufacture of polyesters and polyesteramides have already been mentioned in discussing the preparation of the highly branched resins.

Suitable linear polyethers include hydroxyl-ended polymers and copolymers of cyclic oxides, for example 1:2-alkylene oxides, oxacyclobutane and substituted oxacyclobutanes and tetrahydrofuran. Linear alkylene oxide polymers may be prepared, for example, by the polymerisation of an alkylene oxide in the presence of a basic catalyst, such as potassium hydroxide, and a compound having two active hydrogen atoms per molecule, for example, water, glycols and primary monoamines. The lightly branched polyethers may be prepared by polymerising alkylene oxides in the presence of the polyhydric alcohols and polyamines which are used in larger proportions in the preparation of the highly branched polyethers.

Mixtures of linear and/or lightly branched resins may be used if desired.

The linear and lightly branched resins normally have molecular weights in the range of from 1000 to 8000.

Particularly suitable mixtures of incompatible hydroxyl group-containing resins for use in the process of the present invention are mixtures in which the highly branched resin is a polyester and the linear or lightly branched resin is a polyether. Propoylene oxide polymers are especially suitable polyethers for use in such mixtures.

Examples of suitable organic polyisocyanates include aliphatic diisocyanates such as hexamethylene diisocyanate and aromatic diisocyanates such as tolylene-2:4-diisocyanate, tolylene-2:6-diisocyanate, dihpenylmethane-4:4'-diisocyanate, 3-methyldiphenylmethane-4:4'-diisocyanate, m- and p-phenylene diisocyanates, chlorophenylene-2:4-diisocyanate, naphthalene-1:5-diisocyanate, diphenyl-4:4'-diisocyanate, 3:3' - dimethyl-diphenyl-4:4'-diisocyanate and diphenyl ether diisocyanate. Triisocyanates which may be used include aromatic triisocyanates such as 2:4:6-triisocyanatotoluene and 2:4:4' - triisocyanatodiphenyl ether. Mixtures of polyisocyanates may be used.

Other particularly suitable polyisocyanates include the reaction products of an excess of a diisocyanate with a polyol which may be a simple polyhydric alcohol, a branched polyester or a branched polyether and the polyisocyanate compositions obtained by the phosgenation of the mixed polyamine reaction products of formaldehyde and aromatic amines such as aniline and o-toluidine.

The process of the present invention may be carried out in a continuous or discontinuous manner using, for example, such general methods as are described in the prior art relating to the manufacture of polyurethane foams. Such methods include the use of water together with low boiling-point inert liquids as gas-forming agents. In the present process carbon dioxide blowing gas is provided by using at least 6% by weight of water based on the highly branched resin. Suitable low boiling-point liquids that are inert towards the polyurethane foam-forming ingredients are those having boiling-points not exceeding 75° C., at atmospheric pressure and preferably between −40° C., and 50° C. Examples of such liquids are halogenated hydrocarbons such as monofluorotrichloromethane, dirodifluoromethane, dichloromonofluoromethane, monochlorodifluoromethane, dichlorotetrafluoroethane, 1:1:2-trichloro-1:2:2-trifluoroethane, dibromodifluoromethane, monobromotrifluoroethane and methylene chloride. Mixtures of these low boiling liquids one with another and/or with other substituted or unsubstituted hydrocarbons may also be used. Such liquids are usually employed in amounts of from 20% to 200%, preferably 50% to 120%, by weight of the highly branched resin.

If desired there may also be included in the polyurethane foam-forming reaction mixture a catalyst. Suitable catalysts are well known in the art and include basic compounds of all types, for example alkali metal salts of weak acids such as potassium acetate, and tertiary amines. Examples of suitable tertiary amines include triethylamine, dimethylethylamine, dimethylbenzylamine, dimethylcyclohexylamine, dimethylphenylethylamine, tetramethyl-1:3-butanediamine, triethylene diamine, N-alkylmorpholines, N-alkylpyrrolidines, N-alkylpiperidines, pyrrolizidine, β-dimethylaminopropionamide and fully N-substituted 4-aminopyridines such as 4-dimethylaminopyridine. Amine salts such as dimethylbenzylamine lactate are also suitable. Other suitable catalysts include organic compounds of metals for example dibutyltindilaurate, dibutyltin diacetate, iron acetylacetonate, manganese acetylacetonate, stannous carboxylates such as stannous octoate and lead carboxylates such as lead acetate and lead octoate. Mixtures of catalysts are often particularly advantageous.

As described in the prior art, the general methods of preparation of polyurethane foams may include the incorporation in the reaction mixture of various additives, for example surface-active agents. Suitable surface-active agents include silicone fluids and particularly siloxane-oxyalkylene block copolymers. Oxyethylated phenols, oxyethylated fatty alcohols and block copolymers of ethylene and propylene oxides are examples of other surface-active agents which may be employed. Other additives which may be incorporated in the reaction mixture include non-polymeric cross-linking agents, for example, triethanolamine or glycerol, foam-stabilising agents, for example, ethyl cellulose, colouring matters, fillers, plasticisers, flame retardants such as tri(β-chloroethyl)phosphate or antimony oxide and antioxidants such as tertiary butyl catechol.

The invention is illustrated but not limited by the following examples in which parts and percentages are by weight.

Example 1

A first premix is prepared by stirring together 25 parts of a highly branched polyester prepared by condensing 14 molecular proportions of trimethylolpropane with 6 molecular proportions of adipic acid and having a hydroxyl number of 636, an acid number of 2.7 and a viscosity of 382 poises at 25° C., 13 parts of a 66% aqueous solution of dimethylbenzylamine lactate, 27 parts of a 63% aqueous solution of potassium acetate, 20 parts of polypropylene glycol of molecular weight 2000 and hydroxyl number 56 and 2 parts of dibutyltin dilaurate.

A second premix is prepared comprising: 20 parts of monofluorotrichloromethane, 2 parts of a siloxane-oxyalkylene block copolymer and 100 parts of a diphenylmethane diisocyanate composition obtained by phosgenating crude diaminodiphenylmethane containing about 15% of polyamines (mainly triamines) prepared by the condensation of formaldehyde with aniline in the presence of hydrochloric acid.

The homogeneous second premix is then added to the first premix which is an unstable emulsion and the whole is given a thorough stirring for 15 seconds after which time expansion occurs over a period of 1 minute to give an open-celled foam of fine texture having a density of 0.7 lb./cu.ft. The foam has good dimensional stability and combines a high resistance to compression with the ability to recover from small deformations.

*Example 2*

The procedure described in Example 1 is repeated but the polyester ingredient of the first premix is replaced by 25 parts of a highly branched polyester prepared by condensing 363 parts of commercial 1:3:5-hexanetriol with 206 parts of adipic acid and 42 parts of phthalic anhydride and having a hydroxyl number of 220, an acid number of 2 and a viscosity of 12,000 poises at 25° C.

The two premixes are stirred together vigorously for 15 seconds before expansion occurs over a period of 1 minute to give an open-celled, fine-textured foam having a density of 0.6 lb./cu.ft. The foam combines good resistance to compression with a slight degree of flexibility.

*Example 3*

The procedure described in Example 1 is repeated but the polyether ingredient of the first premix is replaced by 20 parts of a lightly branched polyether prepared by the addition of propylene oxide to glycerol and having a molecular weight of 3000 and a hydroxyl number of 56.

The two premixes are combined to give an open-celled foam having a density of 0.7 lb./cu. ft. and properties similar to those of the product of Example 1.

*Example 4*

A first premix in the form of an unstable emulsion is prepared by stirring together 15 parts of a highly branched polyether prepared by adding propylene oxide to trimethylolpropane and having a molecular weight of 310, a hydroxyl number of 543 and a viscosity of 17 poises at 25° C., 35 parts of polypropylene glycol of molecular weight 2000, 13 parts of a 66% aqueous solution of dimethylbenzylamine lactate, 2 parts of dibutyltin dilaurate and 5 parts of water.

A second premix is prepared comprising: 20 parts of monofluorotrichloromethane, 2 parts of a siloxane-oxyalkylene block copolymer and 100 parts of the diphenylmethane diisocyanate composition described in Example 1.

The two premixes are stirred together vigorously for 12 seconds after which time expansion occurs to give an open-celled, fine-textured foam having a density of 0.8 lb./cu. ft. The foam has excellent dimensional stability with compressive resistance and the ability to recover from small deformations.

*Example 5*

A first premix is prepared comprising: 50 parts of the highly branched polyester described in Example 2, 20 parts of a highly branched polyether prepared by adding propylene oxide to triethanolamine and having a molecular weight of 378, a hydroxyl number of 445 and a viscosity of 2.5 poises at 25° C., 13 parts of a 66% aqueous solution of dimethylbenzylamine lactate, 50 parts of polypropylene glycol of molecular weight 2000 and 4 parts of dibutyltin dilaurate.

A second premix is prepared comprising: 30 parts of monofluorotrichloromethane, 2 parts of a siloxane-oxyalkylene block copolymer and 200 parts of the diphenyl methane diisocyanate composition described in Example 1.

The homogeneous second premix and the inhomogenous first premix are stirred together vigorously for 10 seconds after which time expansion occurs and a cellular product having a density of 2.0 lbs./cu. ft. is obtained.

The foam has a closed cell content of less than 10% and combines good resistance to compression with sufficient flexibility to facilitate handling.

*Example 6*

The procedure of Example 5 is repeated but increasing the monofluorotrichloromethane content of the second premix from 30 to 50 parts.

The foamed product has a density of 1.5 lbs./cu. ft. and characteristics similar to those of the product of Example 5.

*Example 7*

The procedure of Example 6 is repeated but in addition to the components of the first premix already described, 3 parts of water are also incorporated. The open-celled foam so produced has a density of 1.0 lb./cu. ft.

*Example 8*

A first premix in the form of an unstable emulsion is prepared by mixing together:

25 parts of the highly branched polyester described in Example 2, 10 parts of the highly branched oxypropylated triethanolamine described in Example 5, 13 parts of a 66% aqueous solution of dimethylbenzylamine lactate, 5 parts of water, 25 parts of linear polypropylene glycol of molecular weight 2000 and 2 parts of dibutyltin dilaurate.

A second premix is prepared comprising:

30 parts of monofluorotrichloromethane, 5 parts of a siloxane-oxyalkylene block copolymer and 95 parts of a polyisocyanate composition having an NCO content of 30.4% and a viscosity of 31 poises at 25° C. prepared by reacting an excess of an 80/20 mixture of tolylene-2:4- and 2:6-diisocyanates with a polyester obtained by condensing 8 molecular proportions of trimethylolpropane and 1 molecular proportion of pentaerythritol with 4 molecular proportions of adipic acid and having a hydroxyl number of 671 and an acid number of 1.4.

The two premixes are stirred together vigorously for 10 seconds after which time expansion takes place over 70 seconds to give an open-celled, fine textured foam which is tack-free after a further 30 seconds and which has a density of 0.7 lb./cu. ft.

*Example 9*

Example 8 is repeated with the omission of the oxypropylated triethanolamine from the first premix.

The two premixes are combined with vigorous stirring and produce an open-celled foam having a fine, even texture and a density of 0.7 lb./cu. ft.

*Example 10*

A first premix in the form of an unstable emulsion is prepared by mixing together 50 parts of the highly branched polyester described in Example 1, 15 parts of triethanolamine, 13 parts of a 66% aqueous solution of dimethylbenzylamine lactate, 4 parts of dibutyltin dilaurate and 50 parts of polypropylene glycol of molecular weight 2000.

A second premix is prepared as described in Example 6.

The two premixes are stirred together vigorously for 15 seconds and a fine, even cellular product is obtained having a density of 1.7 lb./cu. ft. and a closed cell content of less than 10%.

*Example 11*

The procedure of Example 10 is repeated but replacing the polypropylene glycol by 50 parts of the lightly branched polyether described in Example 3.

The foamed product has a density of 1.8 lbs./cu.ft. and is similar to the product of Example 10 but having slightly greater flexibility. It is characterized by the same excellent dimensional stability under a variety of conditions.

*Example 12*

The procedure of Example 5 is repeated with the omission of the oxypropylated triethanolamine from the first premix.

A fine-textured, open-celled foam having a density of 1.7 lbs./cu.ft. is obtained.

Example 13

The procedure of Example 12 is repeated but replacing the polypropylene glycol by 50 parts of the lightly branched polyether described in Example 3.

The premixes are blended together for 20 seconds after which time foaming takes place over 1 minute to give a fine, cellular product having good compression resistance with a degree of flexibility. The foam has a closed cell content of less than 10% and a density of 1.9 lbs./cu.ft.

Example 14

The procedure of Example 12 is repeated but replacing the polypropylene glycol by 50 parts of a lightly branched polyether obtained by the addition of propylene oxide to trimethylolpropane and having a molecular weight of 2500 and a hydroxyl number of 67. The open-celled foam which is obtained has excellent dimensional stability and a density of 2.1 lbs./cu.ft.

What we claim is:

1. A process for the manufacture of rigid polyurethane foams having at least 90% of open cells and a density up to 2 lbs. per cubic foot which comprises reacting together (a) an organic polyisocyanate, (b) a mixture of hydroxyl group-containing resins which contains from 30% to 70% by weight of a polyester resin having at least 3 hydroxyl groups per 1000 units of molecular weight, and a second hydroxyl group-containing resin selected from the group consisting of linear polyether resins having 2 hydroxyl groups per molecule and lightly branched polyether resins having not more than 3 hydroxyl groups per 1500 units of molecular weight, wherein the polyester resin is incompatible with said polyether resin and (c) at least 6% by weight of water based on the polyester, in the presence of 20 to 200% by weight of said polyester of a halogenated hydrocarbon having a boiling point not exceeding 75° C. at atmospheric pressure.

2. A process for the manufacture of substantially open-celled rigid polyurethane foams as claimed in claim 1 wherein the hydroxyl group-containing polyether is a propylene oxide polymer prepared by polymerizing propylene oxide with a member selected from the group consisting of polyhydric alcohols, water and polyamines.

3. A process for the manufacture of substantially open-celled rigid polyurethane foams as claimed in claim 1 wherein 6 to 46% by weight of water, based on the weight of polyester resin, is used.

4. A process for the manufacture of substantially open-celled rigid polyurethane foams as claimed in claim 1 wherein the mixture of hydroxyl group-containing resins contains from 45% to 60% by weight of the polyester resin.

5. A process for the manufacture of substantially open-celled rigid polyurethane foams as claimed in claim 1 wherein the hydroxyl group-containing polyether is a propylene oxide polymer prepared by polymerizing propylene oxide with polyhydric alcohol.

6. A process for the manufacture of substantially open-celled rigid polyurethane foams as claimed in claim 1 wherein the halogenated hydrocarbon has a boiling point between −40° C. and 50° C. at atmospheric pressure.

7. A process for the manufacture of substantially open-celled rigid polyurethane foams as claimed in claim 1 wherein the halogenated hydrocarbon is used in an amount of from 50% to 120% by weight of the polyester.

References Cited by the Examiner

UNITED STATES PATENTS

| | | | |
|---|---|---|---|
| 2,955,056 | 10/1960 | Knox | 260—2.5 XR |
| 3,194,773 | 7/1965 | Hostettler | 260—2.5 |

OTHER REFERENCES

Barringer: "Rigid Urethane Foams–11 Chemistry and Formulation," Du Pont Elastomer Chemicals Dept. Bulletin HR–26, April 1958, pages 27, 28 and 29.

LEON J. BERCOVITZ, *Primary Examiner.*

DONALD E. CZAJA, *Examiner.*